United States Patent [19]
Sasaki et al.

[11] 3,957,020
[45] May 18, 1976

[54] IGNITION SYSTEM FOR ROTARY PISTON ENGINES

[75] Inventors: Yoshio Sasaki, Toyota; Minoru Morita, Nagoya, both of Japan

[73] Assignee: Toyota Jidosha Kogyo Kabushiki Kaisha, Toyota, Japan

[22] Filed: June 19, 1974

[21] Appl. No.: 480,845

[30] Foreign Application Priority Data
Feb. 18, 1974 Japan............................ 49-18521

[52] U.S. Cl. .......................... 123/8.05; 123/8.09; 123/148 DS
[51] Int. Cl.² ........................................ F02B 53/12
[58] Field of Search ............... 123/8.09, 8.05, 8.07, 123/8.45, 148 DS

[56] References Cited
UNITED STATES PATENTS

| | | |
|---|---|---|
| 3,534,717 | 10/1970 | Froede ............................ 123/8.05 |
| 3,584,608 | 6/1971 | Shibagaki ..................... 123/8.09 X |
| 3,685,295 | 8/1972 | Tatsutomi ..................... 123/148 DS |
| 3,752,128 | 8/1973 | Tatsutomi ......................... 123/8.09 |
| 3,809,042 | 5/1974 | Hosho .......................... 123/148 DS |

Primary Examiner—Clarence R. Gordon
Attorney, Agent, or Firm—Stevens, Davis, Miller & Mosher

[57] ABSTRACT

An ignition system for rotary piston engines is disclosed wherein a plurality of ignition plugs are arranged and disposed in the combustion chamber in the directon of the rotation of a piston and connected to a common ignition coil so that one of them may be selectively energized depending upon the changing engine operations. The optimum ignition timing may be secured to minimize the pollutions in the exhaust gases.

2 Claims, 2 Drawing Figures

IGNITION SYSTEM FOR ROTARY PISTON ENGINES

BACKGROUND OF THE INVENTION

1. Field of the Invention

The present invention relates to an ignition system for rotary piston engines.

2. Description of the Prior Art

In order to minimize the pollutants such as unburned hydrocarbons and carbon monoxide in the exhaust gases, there has been devised and demonstrated the method for delaying the ignition timing to raise the temperature of the exhaust manifold, thereby effecting the complete combustion of the unburned compounds in the exhaust manifold.

SUMMARY OF THE INVENTION

In view of the above, the present invention has for its object to provide a device simple in construction and inexpensive to manufacture for use with a rotary piston engine which is capable of adjusting the optimum ignition timing depending upon the engine operating conditions, thereby minimizing the pollutants in the exhaust gases. Briefly stated in accordance with the present invention, a plurality of ignition plugs are arranged and disposed in one row in the direction of rotation of a piston in a combustion chamber in a rotary piston engine and are connected through an ignition switching device to a common ignition coil so that one of the ignition plugs may be energized depending upon the engine operating conditions with the optimum timing.

DESCRIPTION OF THE PREFERRED EMBODIMENTS

Figure 1:
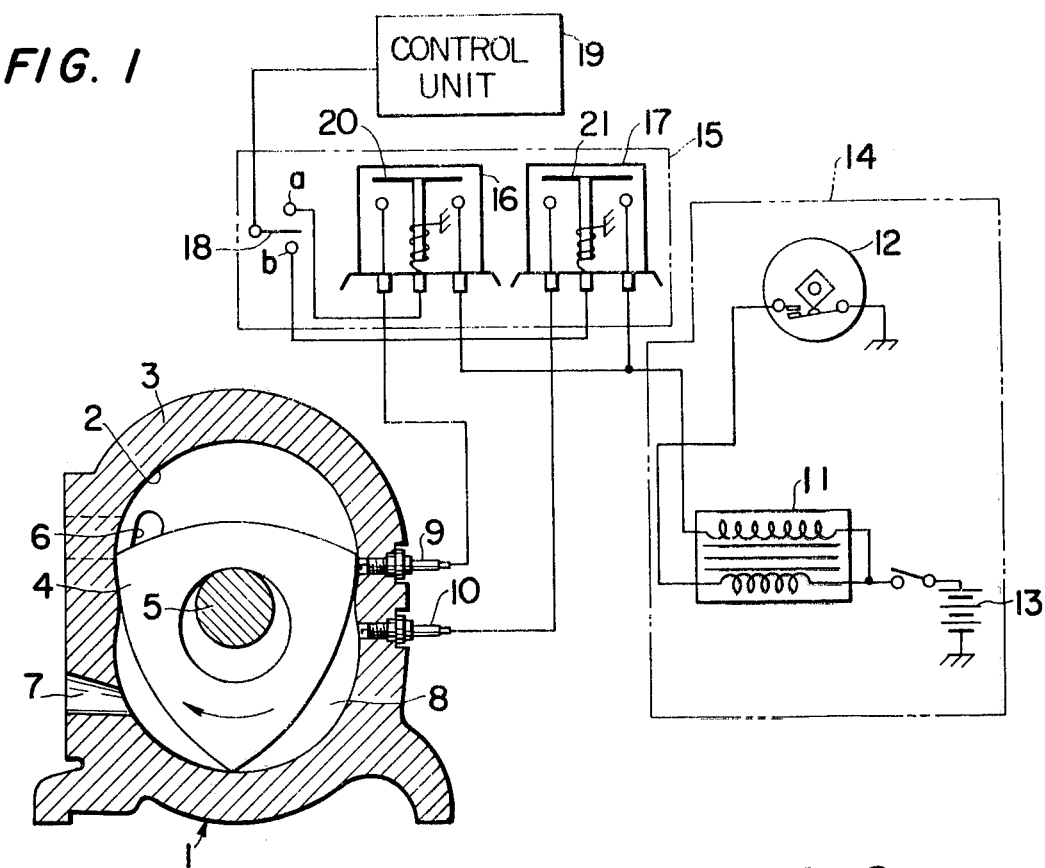
FIGS. 1 and 2 are schematic diagrams of the first and second embodiments of the present invention. Like reference numerals are used to denote similar parts thoughout the figures.

First Embodiment, FIG. 1

Referring to FIG. 1, a rotary piston engine generally indicated by 1 comprises a casing 3 with an epitrochoidal inner surface 2, a triangular piston 4 and an output shaft 5. The suction and discharge ports 6 and 7 are formed through the casing 3. The triangular piston 4 rotates in the direction indicated by the arrow with its apexes in contact with the wall of the epitrochoidal chamber so that three small chambers 8 between the epitrochoidal wall 2 and the triangular piston 4 change their volumes. In the combustion chamber 8 are disposed two ignition plugs 9 and 10 in the order named in the direction of rotation of the triangular piston 4 and and they are electrically connected through an ignition switching device generally indicated by 15 to an ignition circuit generally indicated by 14, comprising an ignition coil 11, an ignition distributor 12 and a battery 13. The ignition switching device 15 comprises two relays 16 and 17 available in the market and a selection switch 18 for selectively energizing the relay 16 or.17. The selection switch 18 is adapted to be automatically actuated by a control unit 19 in response to the engine operating condition such as the engine or vehicle speed or negative pressure in the intake manifold.

Under normal engine operating conditions, the control unit 19 causes a movable contact or armature of the selection switch 18 to close a fixed contact $a$ so that the solenoid of the relay 16 is energized. As a result the ignition circuit 14 is connected through an armature 20 to the ignition plug 9 close to the trailing apex of the triangular piston 4 so that only the ignition plug 9 is energized or ignites the change. When it is desired to delay the ignition timing from the normal ignition timing as when the engine is idled or decelerated, the armature of the selection switch 18 closes the fixed contact $b$ in response to the operating condition such as the engine speed, the negative pressure in the intake manifold or the opening of the throttle valve. Therefore, the relay 16 is de-energized while the solenoid of the relay 17 is energized so that the ignition circuit 14 is connected to the ignition plug 10 closer to the leading apex of the piston 4 through an armature 21 of the relay 17. Therefore, the ignition timing may be delayed, and the pollutants such as carbon monoxide and nitrogen oxides in the exhaust gases may be minimized.

Figure 2:
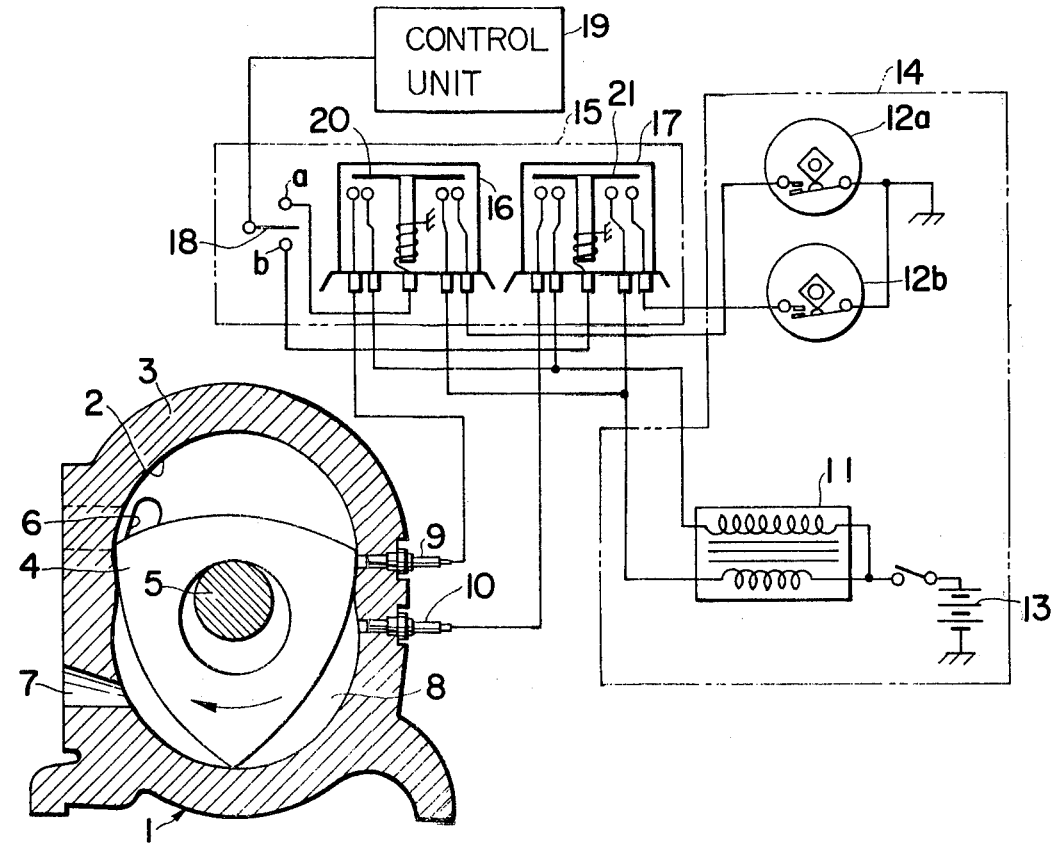

Second Embodiment, FIG. 2

In FIG. 2, like reference numerals are used to designate like parts. The second embodiment is substantially similar in construction to the first embodiment except that the ignition plugs 9 and 10 are connected to their own distributors 12$a$ and 12$b$, respectively. The ignition distributor 12$a$ for the ignition plug 9 has an advanced ignition angle so that the highest power output may be produced with the least consumption of fuel while the ignition distributor 12$b$ for the ignition plug 10 has such an ignition angle that the pollutants contained in the exhaust gases may be minimized. Therefore, more optimum ignition time may be ensured by the second embodiment than by the first embodiment.

As described hereinbefore, according to the present invention the desired objects may be attained by the ignition systems very simple in construction which eleiminates the use of a control circuit very complex in construction and which utilizes only one ignition coil and relays which are available in the market at low cost.

What is claimed is:

1. An ignition system for a rotary piston engine having two ignition plugs arranged in circumferentially spaced relation in the direction of piston rotation, wherein the improvement comprises:
    ignition circuit means including a battery, a single ignition coil and at least one distributor;
    means including switch means for interconnecting said ignition circuit means to each of said plugs; and
    means for sensing the operating condition of said engine and for impressing a signal on said switch means selectively to close a circuit to one or the other of said plugs.

2. A system as disclosed in claim 1 wherein the ignition circuit means comprises two distributors each associated with the switching means serving a different plug.

* * * * *